A. T. BROWN.
COMPUTING MACHINE.
APPLICATION FILED APR. 29, 1915. RENEWED OCT. 2, 1919.
1,325,926.
Patented Dec. 23, 1919.
7 SHEETS—SHEET 1.
Fig-1-
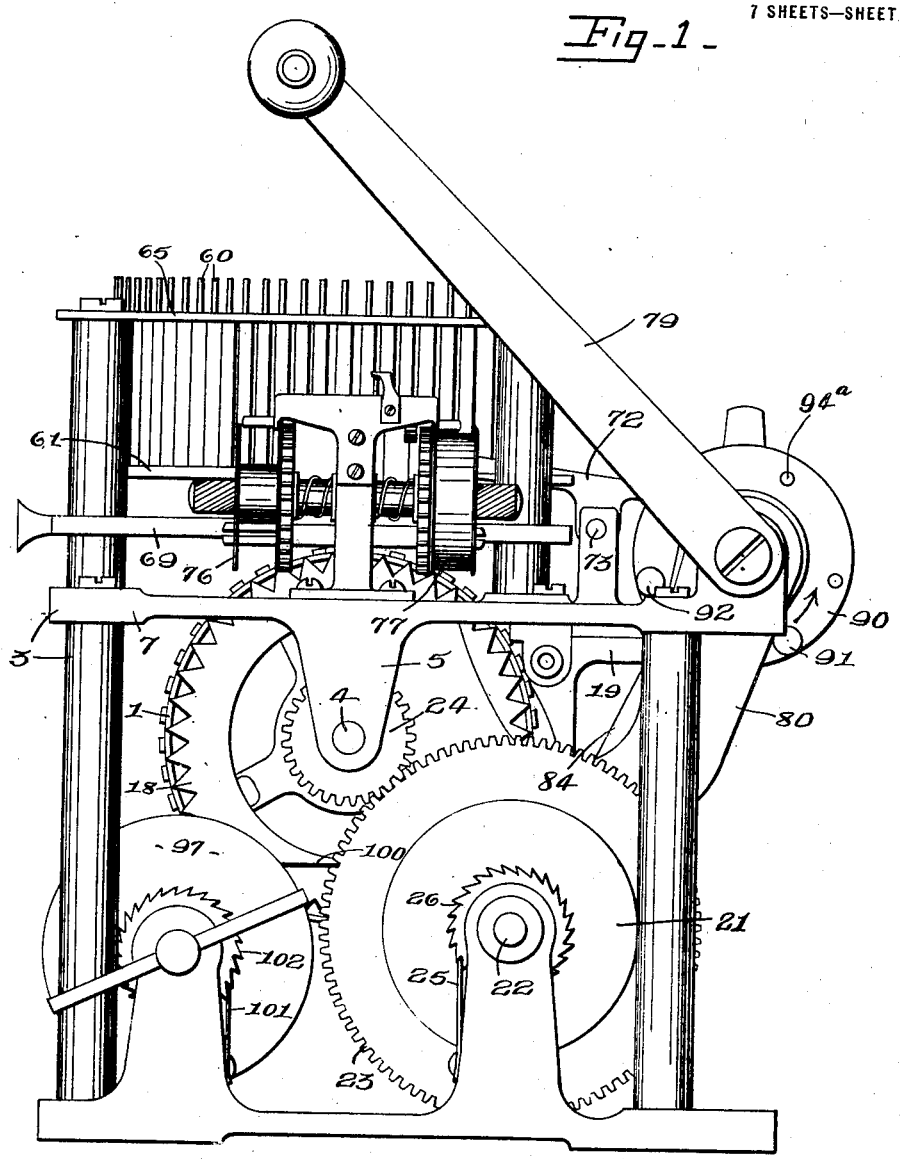
WITNESSES:
INVENTOR.
Alexander T. Brown
BY
ATTORNEYS.

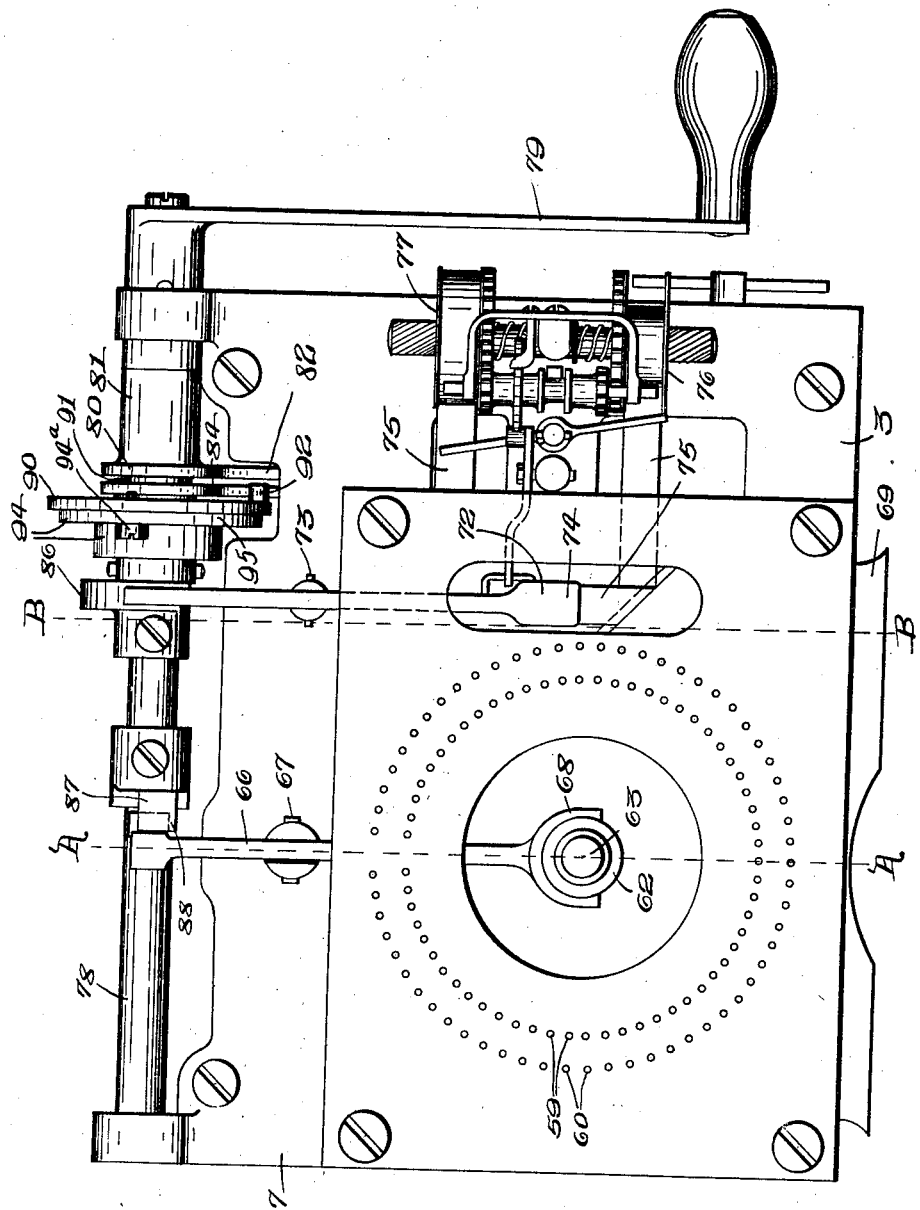

A. T. BROWN.
COMPUTING MACHINE.
APPLICATION FILED APR. 29, 1915. RENEWED OCT. 2, 1919.
1,325,926.
Patented Dec. 23, 1919.
7 SHEETS—SHEET 3.
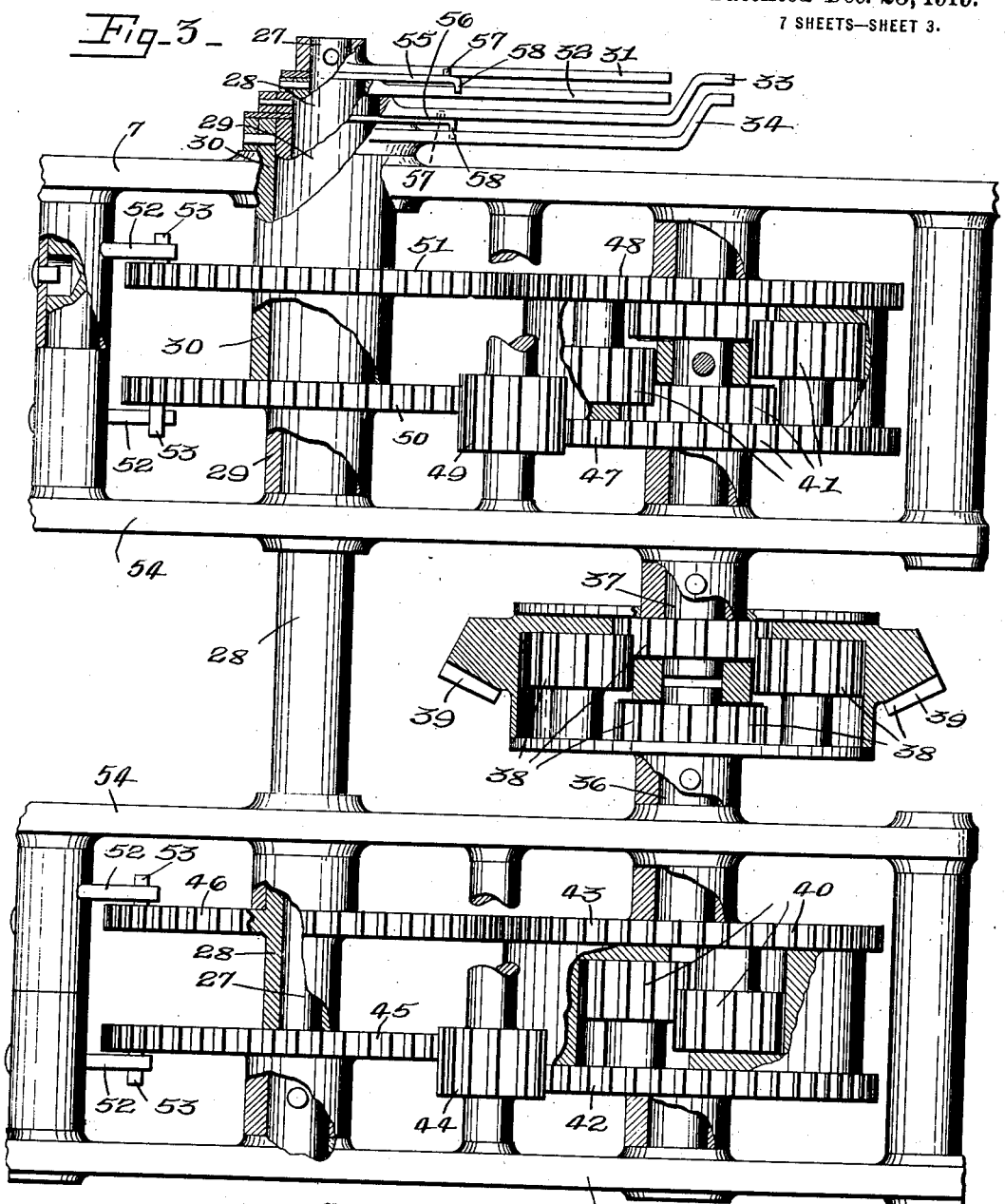
Fig-3-
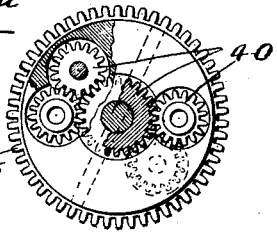
Fig-3a-
WITNESSES:
Chas. H. Young
G. B. Pickard
Alexander T. Brown
INVENTOR.
BY Parson & Powell
ATTORNEYS.

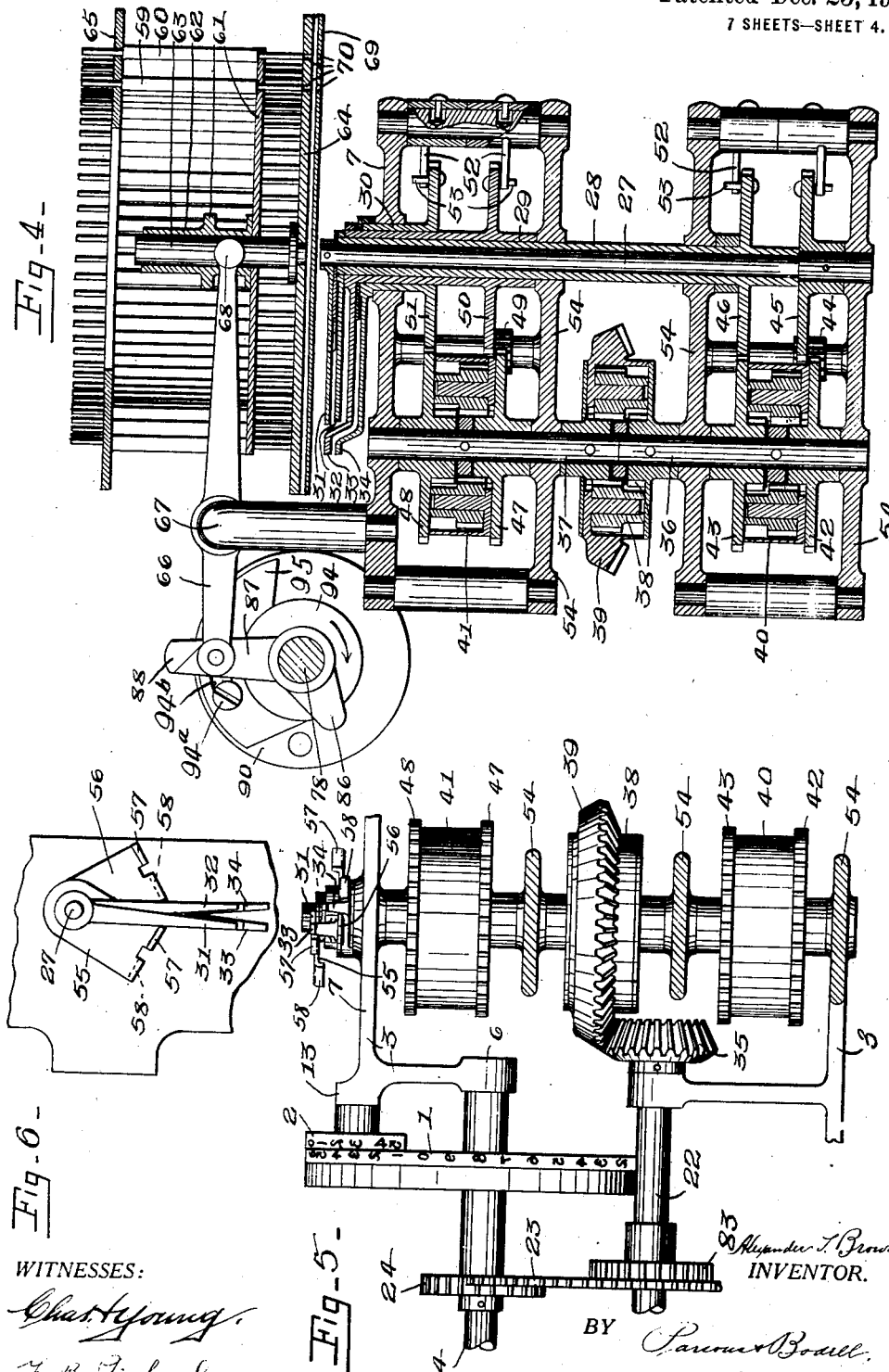
A. T. BROWN.
COMPUTING MACHINE.
APPLICATION FILED APR. 29, 1915. RENEWED OCT. 2, 1919.
1,325,926.
Patented Dec. 23, 1919.
7 SHEETS—SHEET 4.

A. T. BROWN.
COMPUTING MACHINE.
APPLICATION FILED APR. 29, 1915. RENEWED OCT. 2, 1919.
1,325,926. Patented Dec. 23, 1919.
7 SHEETS—SHEET 5.
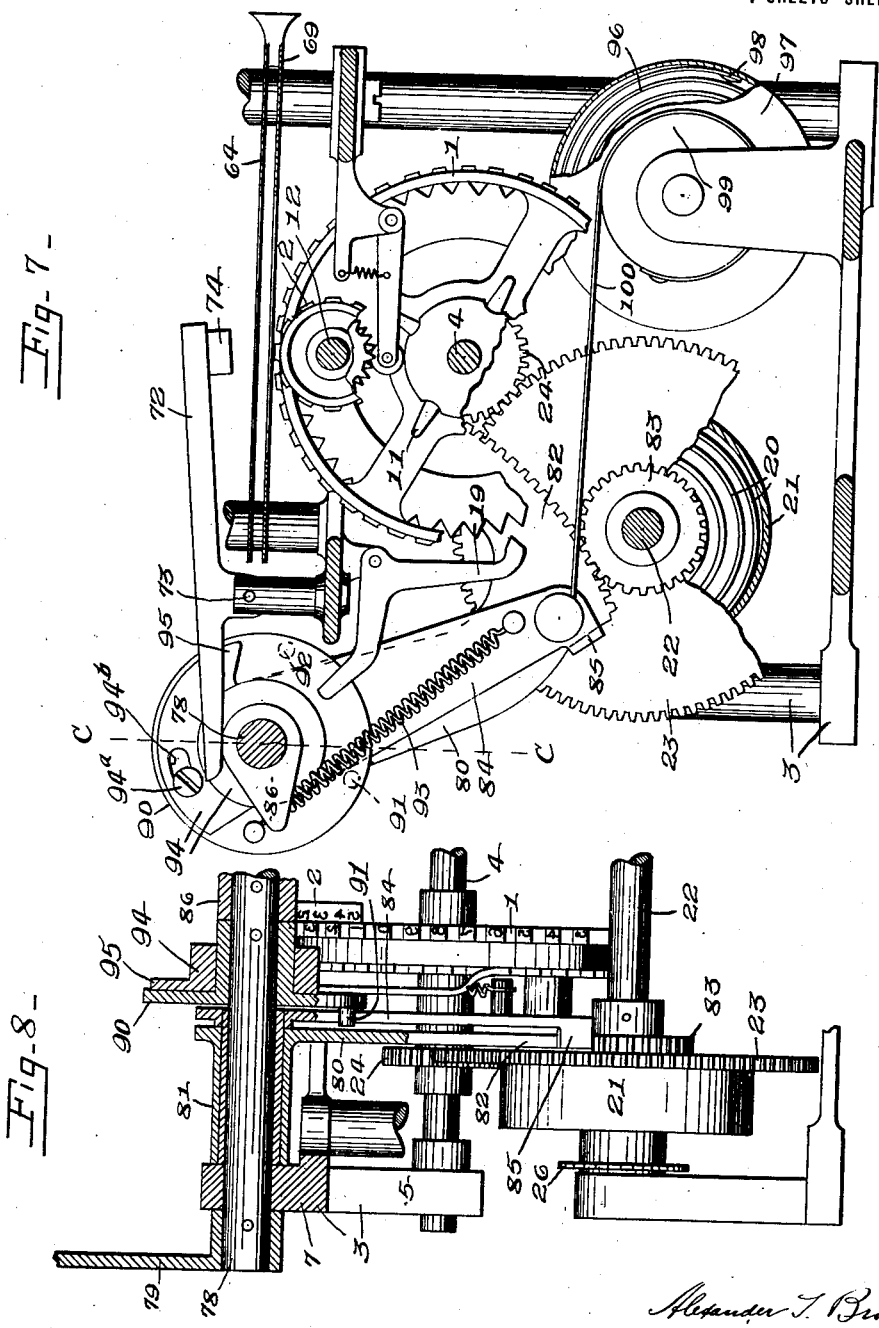

A. T. BROWN.
COMPUTING MACHINE.
APPLICATION FILED APR. 29, 1915. RENEWED OCT. 2, 1919.
1,325,926.
Patented Dec. 23, 1919.
7 SHEETS—SHEET 6.
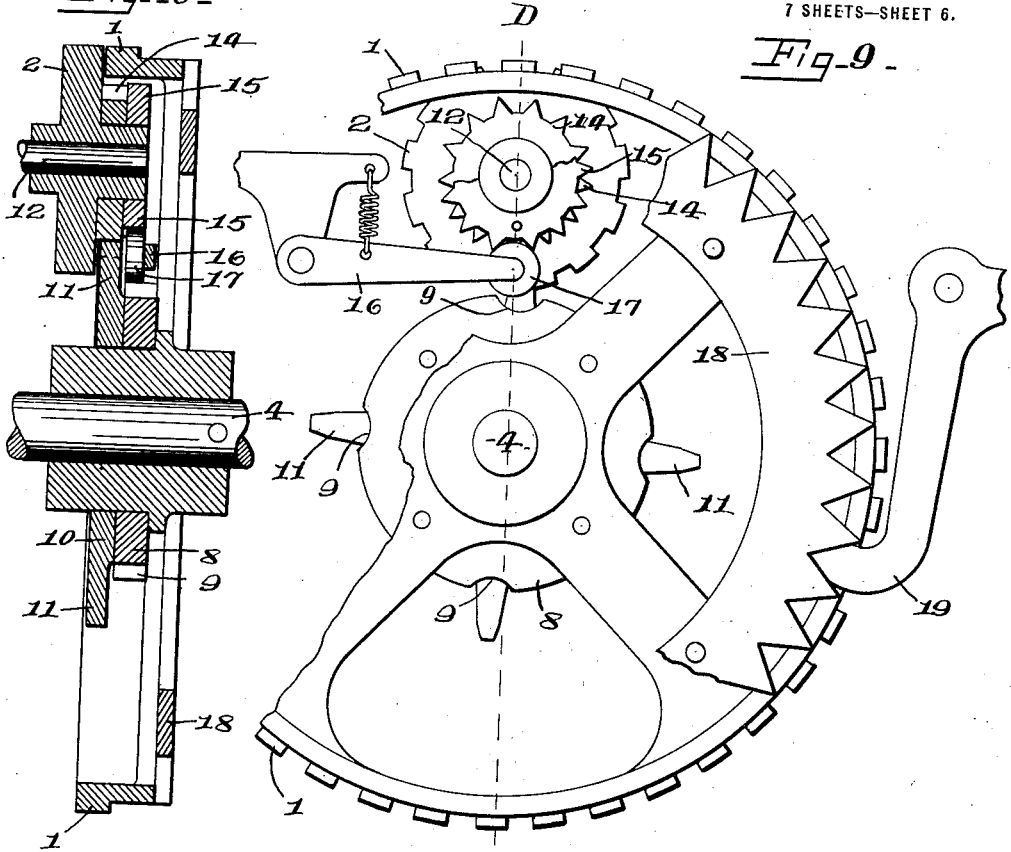
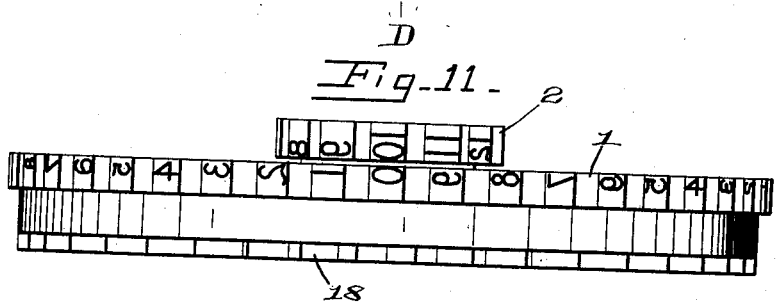
WITNESSES:
Chas H Young
T. B. Pickard
INVENTOR.
Alexander T. Brown
BY Parrour+Boarll
ATTORNEYS.

A. T. BROWN.
COMPUTING MACHINE.
APPLICATION FILED APR. 29, 1915. RENEWED OCT. 2, 1919.
1,325,926.
Patented Dec. 23, 1919.
7 SHEETS—SHEET 7.
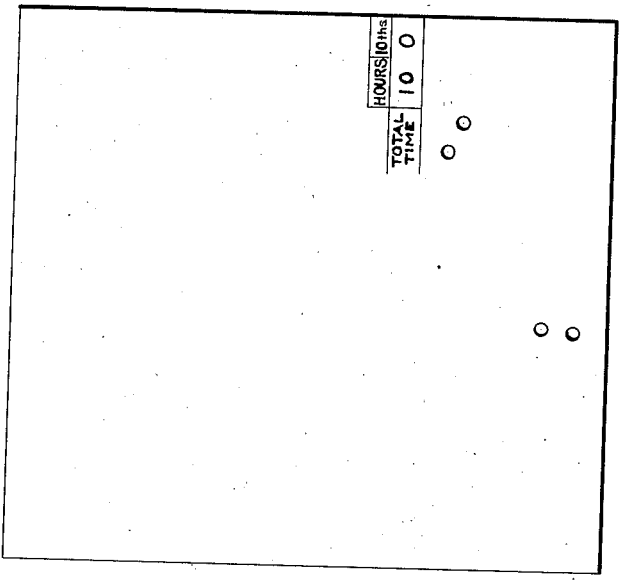
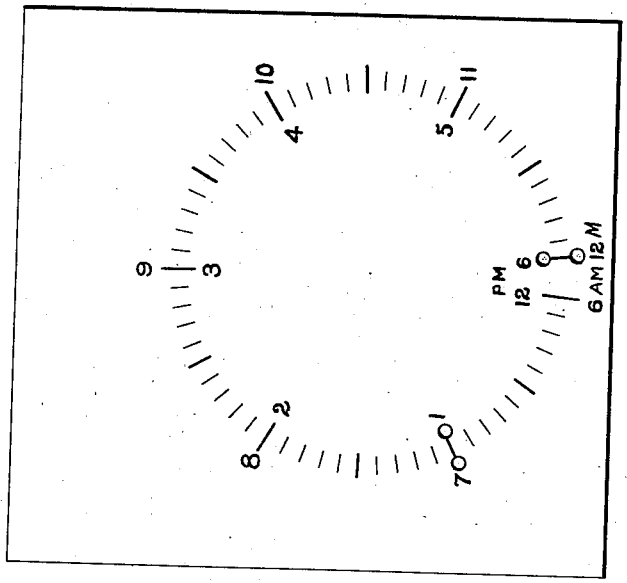

UNITED STATES PATENT OFFICE.

ALEXANDER T. BROWN, OF SYRACUSE, NEW YORK.

COMPUTING-MACHINE.

1,325,926.  Specification of Letters Patent.  Patented Dec. 23, 1919.

Application filed April 29, 1915, Serial No. 24,672.  Renewed October 2, 1919.  Serial No. 328,082.

*To all whom it may concern:*

Be it known that I, ALEXANDER T. BROWN, a citizen of the United States, and a resident of Syracuse, in the county of Onondaga and State of New York, have invented a certain new and useful Computing-Machine, of which the following is a specification.

This invention has for its object the production of a computing machine, which is particularly simple and compact in construction, and highly efficient in use, and it consists in the combinations and constructions hereinafter set forth and claimed.

In describing this invention, reference is had to the accompanying drawings, in which like characters designate corresponding parts in all the views.

Figure 1 is a side elevation of a machine embodying my invention.

Fig. 2 is a plan thereof.

Fig. 3 is an enlarged detail view of the connections between the actuating means and the controllers.

Fig. 3ᵃ is a detail view partly in section of one of the differential gears.

Fig. 4 is a sectional view taken on the plane of line A—A, Fig. 2, parts being omitted.

Fig. 5 is a detail view showing in elevation, looking to the right in Fig. 4, part of the differential mechanism shown in Fig. 4, and contiguous parts, the registers and the connections for actuating the differential mechanism and the registers being also shown.

Fig. 6 is a fragmentary plan view looking downwardly in Fig. 5.

Fig. 7 is a sectional view taken on the plane of line B—B, Fig. 2, the upper portion of the machine being omitted.

Fig. 8 is a fragmentary view taken on the plane of line C—C, Fig. 7, looking to the right.

Fig. 9 is an enlarged detail view of the registers or recording wheels.

Fig. 10 is a section on line D—D, Fig. 9.

Fig. 11 is an edge view of the registers.

Figs. 12 and 13 are opposite face views of the card used in this machine.

This computing machine comprises, generally, a register in which the elapsed time is set, means for actuating the register, controlling means for governing the operation of the actuating means and hence the setting of the register, and means for stopping the controlling means in predetermined positions and hence stopping the actuation of the register. Preferably, there are a plurality of controllers which are actuated by connections between the actuating means and said controllers, which connections include branches for the controllers and differential gearing between the branches, whereby when one controller is stopped the other controller is moved with accelerated motion to its stopping point. The capacity of the machine here shown requires that two registers be used.

1 and 2 designate the registers which are in the form of type wheels suitably mounted to rotate about a horizontal axis in the frame 3, the wheel 1 registering fractions of hours and the wheel 2 registering the number of hours. The wheel 2 is smaller than the wheel 1 and is arranged eccentric thereto with its periphery coincident with the periphery of the wheel 1 at the printing line. In this machine, for convenience in computing, the wheel 1 registers decimal fractions and contains a plurality of series of numbers from 0 to 9 inclusive, and the wheel 2 contains a single series of numbers from 1 to 12 inclusive representing a 12 hour day or night.

The wheel 1 is mounted on a suitable shaft 4 journaled in lugs 5, 6 depending from a top plate 7 of the frame of the machine, and is formed with a disk 8, Figs. 9 and 10, having peripheral depressions 9, and with a disk 10 arranged at the side of the disk 8 and provided with radial arms 11 alined or paired with the depressions 9. There are four depressions 9 and arms 11 corresponding in number to the number of series of numerals from 0 to 9 inclusive on the periphery of the wheel 1.

The wheel 2 is actuated from the wheel 1 at intervals, and is mounted upon a shaft 12 suitably supported by a bracket 13, see Fig. 5, carried by the top plate 7 of the frame of the machine near the bracket 6 which supports the shaft 4, the wheel 2 having fixedly mounted on the hub thereof, two toothed wheels 14, 15. The teeth of one wheel are alined with the notches between the teeth of the other wheel, and the teeth of the wheel 14 are arranged to be engaged by the arms 11 of the register wheel 1 in order to be actuated intermittently by said arms 11. When the wheel 2 is at rest it is held in its set position so as not to be accidentally rotated, by means of a spring pressed pivoted stop 16, Fig. 9, carrying a roller 17 at its free end which roller partly extends into one of the notches of the wheel 15. The stop 16 is held from pivotal movement by the periphery of the cam disk 8 which engages the roller 17 during the rotation of the wheel 1. The stop is operated to release the wheel 2, when one of the depressions 9 registers with the roller 17, by the teeth of the wheel 15 which act downwardly on the roller 17 to depress the stop 16 against the action of its spring and move the roller into a depression 9 where it remains until the wheel 2 has made a single step. The spring of the stop 16 then moves the stop to carry the roller into the next notch of the wheel 15. The rotation of the wheel 15 to move the stop 16 as described is effected by one of the arms 11 engaging a tooth on the wheel 14.

The wheel 1 is provided with a notched plate 18 with which a suitable detent 19 co-acts for holding the wheel centered during the printing operation, this detent 19 being operated as hereinafter described.

The actuating means for the wheel 1, as here shown, comprises a motor, as a coil spring 20, Fig. 7, located in a stationary case 21, Fig. 1, a rotatable shaft 22 upon which the case is loosely mounted and to one end of which the spring is connected, a gear wheel 23, Fig. 1 mounted on the shaft to rotate therewith, and meshing with a gear wheel 24 on the shaft 4 upon which the register wheel 1 is mounted. The case 21 is fixed from movement, and hence the tension of the spring rotates the shaft 22. This case 21 is normally held from rotation by a pawl 25, Fig. 1, coacting with the ratchet wheel 26 mounted on the hub of the case 21.

The controlling means includes controllers, and connections between the controllers and the actuating means for the registers, these connections including branches connected respectively to the controllers, and differential gearing between the branches.

In this embodiment of my invention, the controllers move about a common axis and there are two pairs of controllers, and the connections for actuating the controllers include main branches connected respectively to the pairs, and each main branch has sub-branches connected respectively to the units of the pairs, and differential gearing is located between the main branches and differential gearing is located between each pair of sub-branches.

In this embodiment of my invention, see Figs. 3 and 4, the controllers include a plurality of nested shafts 27, 28, 29, 30 and radial arms 31, 32, 33, 34. The shafts 27, 28 with their arms 31, 32 constitute one pair of controllers, and the shafts 29, 30 with their arms 33, 34 constitute the other pair, and the shafts 27, 28 are connected to rotate in opposite directions, and the shafts 29, 30 are connected to rotate in opposite directions.

The connections between the shafts 27, 28, 29 30 and the actuating means for the registers include a beveled gear 35 mounted on the shaft 22, shaft sections 36, 37 arranged in vertical position and end to end, a differential gearing 38 connecting the shaft sections 36, 37 and including a beveled gear 39 meshing with the gear 35, differential gearing 40, 41 mounted on the shaft sections 36, 37 respectively, the opposite sides of each of which are connected to the shafts 27, 28 or 29, 30. As here shown, the opposite sides of the differential gearing 40 are formed with gear wheels 42, 43, to which differential motion is transmitted by the equalizing pinions of the gearing 40, the gear 42, meshing with an idler 44 which in turn meshes with a gear wheel 45 mounted on the lower end of the controller shaft 27. The other gear 43 of the differential gear 40 meshes with the gear wheel 46 mounted on the lower end of the shaft 28. The differential gearing 41 is similarly connected to the shafts 29, 30, the gearing being provided on opposite sides thereof with gears 47, 48 similar to the gears 42, 43, the gear 47 meshing with an idler 49 which meshes with a gear wheel 50 on the shaft 29; and the gear 48 meshing directly with the gear 51 on the shaft 30.

Owing to the interposition of the idlers 44 and 49, the shafts 27, 29 rotate in an opposite direction to that of the shafts 28, 30. The starting positions of the shafts 27, 28, 29, 30 are determined by fixed stops 52 coacting with shoulders 53 on the gears 45, 46, 50 and 51. The shafts 27, 28, 29, 30 and the shaft sections 36, 37 are suitably supported by the top plate 7 and frame elements 54 forming part of the main frame 3.

When four of the stops, to be hereinafter described, are set in position to limit the arms 31, 32, 33, 34 the main driving bevel gear 39, differential gears 38, 40 and 41 first rotate as a unit upon the actuation of the handle. Upon the stopping of one of said arms as the arm 34, the gear 48, referring particularly to Figs. 4 and 5, which meshes with the gear 51 associated with said arm 34, is likewise stopped from rotation, and hence the equalizing or planetary pinions of the differential gear 41 will rotate on their own axes as well as travel planetarily, so that the gear 47 which actuates the arm 33 will travel as fast as the main driven gear 39 and shaft sections 36, 37 plus the motion delivered thereto by the rotation of said planetary pinions, as in any differential gear. In other words, the gear 47 will rotate at a rate equal to the planetary or orbital movement of the pinions of the gear 41 plus the rotative movement of said pinions.

When the arm 33 is limited by another of the stops, the entire shaft section 37 is held from rotation, and hence the planetary pinions of the differential gear 38 will rotate about their axes as well as travel planetarily so that the shaft section 36 is turned at a rate equal to that of the main drive gear 39 plus the rotative movement of the pinions of the differential gear 38.

Assuming that the arm 32 is next held by a third stop, then the gear 43 connected to the gear 46 on the shaft 28 carrying said arm 32 will be held from rotation and the gear 42 which actuates the remaining arm 31 will receive until held by the fourth stop, the motion of the shaft 36 which shaft is now being actuated by the gear 39, rotative movement of the planetary pinions of the differential gear 38 and the rotative movement of the planetary pinions of the differential gear 40. This is but one example of the actuation of the differential gears. The arms 31, 32, 33, 34 will be stopped in various other orders or sequences but in whatever order they are stopped when one is stopped the remaining arms receive accelerated motion due to the action of the differential gears. The action of differential gears is well known and it is thought that further description is unnecessary.

The rotation of the shafts 27, 28, 29, 30 with their arms 31, 32, 33, 34, is limited to approximately a half revolution for each, (when the arms are not stopped, as hereinafter described,) by means which prevent the arms of each pair from passing each other. Said means consists of short arms 55, 56, Figs. 3 and 6, loosely mounted on the shafts 27, 28 between the arms 31, 32, and 33, 34, each having an upturned lug 57 and a downturned lug 58. When one pair of arms, for instance as the arms 31, 32 are limited in their rotation by the stops to be hereinafter described, so that they can not make a half revolution, the other pair of arms 33, 34 which are not prevented from moving by the stops to be described, are limited to a half revolution, as one or the other of the arms 33, 34 will engage with the lug 57 or 58 of the arm 56 and carry said arm 56 therewith, until the other arm engages the other of the lugs 57, 58. The lower arm 34 engages the lug 58 and the upper arm 33 engages the lug 57. As these controller arms 33, 34 are moving at the same rate of speed, they will make approximately a half revolution before both of said arms 33, 34 are engaged with the lugs 57, 58. The same operation takes place when the other pair of arms 31, 32 are not held by the stops with the exception that the arm 55 coacts with the arms 31, 32.

The means for stopping the arms 31, 32, 33, 34 in predetermined positions comprises two series of keys or stops 59, 60 which are here shown as concentrically arranged, said series being also arranged concentrically with the axis of the nested shafts 27, 28, 29, 30 above the arms 31, 32, 33, 34 and being movable into the paths of movement of said arms. The outer series of stops coact with the arms 33, 34 which are longer than the arms 31, 32, and which have upturned ends arranged in the horizontal plane of the arms 31, 32. The inner series of the stops coact with the arms 31, 32. Both series of the stops are supported in vertical position in a carrier 61, see Fig. 4, which is a plate formed with perforations through which the stops project, the plate having a hub 62 slidable along a shaft 63 suitably supported on a horizontal plate 64 mounted on the frame above the top plate 7. The stops are guided in their movement by holes in the carrier 61, the plate 64 and a plate 65 mounted on posts rising from the plate 64. The intermediate portions of the stops between the carrier 61 and the plate 65 are enlarged and the ends of the enlargements abut against the carrier 61 and plate 65.

The carrier 61 is movable vertically by means of a lever 66 pivoted between its ends to a bracket 67, one arm of the lever having a fork 68 coacting with a grooved collar on the hub 62, and the other arm thereof coacting with the operating means, to be described. The carrier 61 is arranged to move downwardly by gravity and to be raised by the operating means.

The perforated plate 64 forms the upper side of a card receiver 69 arranged in horizontal position above the paths of movement of the controlling arms 31, 32, 33, 34, the plate 64 and also the lower side of the card receiver 69 being formed with alined perforations 70 through which the pins or stops 59, 60 move when the carrier 61 is permitted to move downwardly. It is intended that a card of the character shown in Figs. 12 and 13 be used in this machine, said card having a circular graduated chart thereon composed of inner and outer concentric series of numerals, the outer series of numerals representing the hours of the forenoon and the inner series the hours of the afternoon, and the graduations representing hours and decimal fractions of hours corresponding to the type on the registering wheels 1, 2.

When the workman enters his place of employment, or when a particular job is begun, the cost of which is to be kept, a perforation is made in the card at the point representing the time of day that work is begun, and when the workman leaves, or a job is completed, a similar perforation is made, the perforations made during the morning being made at the outside of the graduations of the chart, and those made during the afternoon on the inside of the graduations. So far as this invention is concerned, these perforations may be made with a hand punch, but are in fact made by a recorder arranged to punch the holes in the proper places. This recorder forms the subject matter of another application.

The card illustrated shows that the workman entered at 7. A. M. and worked until noon, and again entered at 1 P. M. and worked until 6 P. M. When the card illustrated is placed in the card receiver 69 and the machine operated, all the stops 59, 60 with the exception of four will be held by the card from moving into the paths of movement of the arms 31, 32, 33, 34. These four stops will pass through the holes in the card opposite the numerals 7 A. M. and 12 M., and 1 P. M. and 6 P. M., and will stop the controller arms 31, 32, 33, 34 in their positions. These arms will start from the common starting point located between the pins or stops 59, 60 corresponding to 6 P. M. and 12 noon, and 12 midnight and 6 A. M. graduations on the card, and in this particular instance the arms 33, 34 move in opposite directions against the pins or stops extending through the outer holes of the card located at 7. A. M. and at 12 noon, and the arms 31, 32, move in opposite directions against the stops projecting through the holes located at 1 and 6 P. M.

Reading on the card, the sum total of the movement of these arms 31, 32, 33 and 34 is two hours as the arm 34 which we will assume abuts against the 12 noon stop makes practically no movement that is taken into account, and the other arm 33 makes a movement equivalent to one hour. Likewise, reading on the card, the arm 32 makes no movement that is considered and the arm 31 makes a movement of one hour. The sum total of the movement of the arms is equal to two hours which when subtracted from 12 hours which is the total capacity of the register wheels, leaves ten hours elapsed time.

From the foregoing, it will be seen that the elasped time is obtained, not by adding, but by subtracting the sum of the unelapsed time from the total number of hours capable of being registered by the register wheels 1 and 2. In case it is not time that is being computed, the amount of units of measure unused of any description, as dollars, cubic feet or kilowatts, etc., is subtracted from the total capacity of the registers, and the result is the units used. In the card here illustrated, the record is perfect, that is, the workman entered and left in both the A. M. and P. M. periods at the regular times, and when such card is placed in the card receiver all the arms 31, 32, 33, 34 will stop at the indicated stops. But assuming that a card is placed in the card receiver having but two perforations, to wit: at 7 A. M. and 12 noon, then the longer arms 33, 34 will move into engagement with the stops 60 projecting through the 7 A. M. and 12 noon holes while the shorter arms 31, 32 will each make approximately a half revolution.

Reading on the card, the sum total of the movement of the arms 33, 34 will be one hour, while the sum total of the movement of the shorter arms 31, 32 through their half revolutions will be six hours, so that the sum total of the movement of all the arms 31, 32, 33, 34 will be seven hours which deducted from 12 hours which the registers are capable of registering will leave a working period of five hours. During this last assumed computing operation, the arm 34 practically stands still, and as this arm is moved by the side 48 of the differential gearing 41, the differential movement is transmitted equally through the differential gearing 41, 38 and 40 to the arms 33, 31, 32 increasing the movement of said arms equally and thereby bringing the arm 33 with accelerated motion against the stop at 7 A. M., whereupon the differential gearing 41 is idle and the shaft section 37 held from movement, and the arms 31, 32 are actuated with further increased speed until they make their half revolution. Hence the shaft 22, which drives the registers and is driven by the motor 20, is held from rotation and the time that this shaft is permitted to rotate, and hence the time the registers are being actuated, is regulated by the time it takes for all of the arms 31, 32, 33, 34 to come to rest. Owing to the differential gearing when one arm is stopped, the remaining three move with increased speed to their destination. When two arms are stopped the remaining two arms move with additionally increased speed, and when three arms are stopped, the remaining arm moves with still greater speed to its stopping point.

If the workman neglects to complete his record by omitting to have a hole punched, the unelapsed time is increased and as but one controller of one pair will engage a stop 59 or 60, the other controller of said pair will make a complete revolution less the amount the former controller has moved. Hence the sum total of the movements of said pair of controllers will be one revolution and the record recorded in the register will be zero. Hence, a workman automatically "docks" himself when he fails to make a record on his card.

The record is made on the card by a platen 72 pivoted at 73 between its ends and having a head 74 movable toward and from the type at the printing line of the wheels 1, 2. This hammer 72 is actuated by the operating mechanism, as hereinafter described. A suitable ribbon 75, Figs. 1 and 2, moves across the printing line, the ribbon winding on spools 76, 77. The feeding movement of the ribbon is effected by any suitable ribbon mechanism which it is thought unnecessary to describe in detail.

The operating means, which permits the operation of the motor and parts driven thereby until the arms 31, 32, 33, 34 are all stopped by the stops 59, 60, includes a shaft 78, Fig. 2, having a handle 79 at one end, a rock arm 80 having a hub 81 loosely mounted on the shaft, the rock arm carrying a segment 82, Fig. 7, meshing with a gear 83 on the shaft 22, see Figs. 5 and 8, and an arm 84 mounted on said shaft 78, and connected thereto by a lost motion and having a shoulder 85 arranged in advance of the segment arm 80, in order to move away from the segment and permit the segment to be actuated by the motor spring 20 until the controllers are stopped.

The operating mechanism further includes a cam 86, Fig. 7, mounted on the shaft 78 and coacting with the tail of the hammer 72, and also a rock arm 87, Fig. 4, having a shoulder 88 which controls the carrier 61 for the stops 59, 60. This carrier is movable by gravity when the shoulder 88 is moved to the right, Fig. 4, in order to permit the rear end of the lever 66 to rise.

As before stated, the yarn 84 is connected to the shaft 78 by a lost motion, which lost motion is for the purpose of permitting the arm 87 to move sufficiently to permit the movement of the stops 59, 60 into the path of the arms 31, 32, 33, 34.

As here shown, the shaft 78 is provided with a disk 90, Fig. 2, rigid thereon and having shoulders 91 and 92, Figs. 2 and 7, arranged in front and in the rear of the arm 84 with respect to the movement of the arm, the shoulder 92 being arranged at the front side and normally spaced apart from the front edge of the arm 84. Upon the initial movement of the handle 79 the rock shaft 78 is moved sufficiently to cause the arm 87 to move far enough to permit the stop carrier 61 to drop, before said shoulder 92 engages the front side of the arm 84 and couples the arm 84 to the shaft 78. This movement of the shaft 78 relatively to the arm 84 tensions a spring 93, Fig. 7, connected at one end to the arm 84 and at its other end to the disk 90. As the handle returns to its starting position, this spring 93 rocks the shaft 78 at the end of the retrograde movement of said shaft and causes the arm 87 to carry its shoulder 88 over the roller 89 of the lever 66 supporting the stop carrier 61, in order to raise the stop carrier to its starting position. A part 94 is adjustably mounted on the disk 90 and is provided with a laterally extending shoulder 95, Fig. 7, arranged to engage the tail of the detent 19, Fig. 7, at the end of the forward movement of the rock shaft and actuate the detent to engage a notch in the plate 18 during the printing operation. Said part 94 is adjustably secured to the disk 90 by a screw 94ª passing through a slot 94ᵇ in said part 94 and into the disk 90. The movement of the rock shaft 78 is against a suitable spring 96, Fig. 7, located in the barrel or casing 97, Fig. 1, the spring 96 being connected at one end of the barrel or casing at 98, Fig. 7, and at its other end to a rotating drum 99 which is connected by a strap 100 winding thereon, to the arm 84. This spring 96 returns the handle and associated parts to their starting position and is of greater tension than the spring 20. The barrel or casing 97 is held from rotation by a pawl 101, Fig. 1, which coacts with the ratchet wheel 102 fixed to said barrel or casing 97.

In operation, the operator places his card with the perforations therein, in the card receiver 69, pulls forwardly on the handle 79, this operation first depressing the stop carrier 61 so that certain stops 59, 60 pass through the holes in the card and into the paths of two or more of the arms 31, 32, 33, 34. Further movement of the handle 79 moves the arm 84 away from the segment 80 so that the spring 20 is permitted to actuate the registers and the connections including the differential gearing to the controlling arms 31, 32, 33, 34. When all of these controller arms are limited in their movement, these connections are locked from rotation and hence the spring 20 is not permitted to act. During the latter part of the forward movement of the handle, the cam 86 actuates the hammer 72 to make a record on the card. When the handle is released, the spring 96 returns the parts to their starting position.

Obviously, various other items may be computed on this machine, the extent of which is indicated on a perforated card.

What I claim is:

1. In a computing machine, a register, means for actuating the register, controllers governing the actuation of said means, the controllers being movable variable distances during each computing operation, means for stopping the controllers individually in their paths of movement, and connections between the controllers including differential gearing operating to transfer the movement of a controller when stopped by its stopping means which movement would otherwise be received by such controller if it were not stopped, to another controller and to accelerate the movement of the latter into engagement with the stopping means, substantially as and for the purpose described.

2. In a computing machine, a register, controllers governing the actuation of the register, the controllers being movable variable distances independently of each other during each operation of the machine, means for actuating the register and the controllers, means for stopping the controllers individually at predetermined points in their paths of movement and hence stopping the actuating means and the register in positions corresponding to the total of the movement of the controllers, said actuating means including differential gearing between the controllers for transferring the movement of a controller when stopped which movement would otherwise be received by said controller if not stopped, to another controller and to accelerate the movement of the latter to its stopping point, and a driving element having a uniform movement during the operations of the machine, said element being connected to the actuating means to move relatively thereto when the controllers are stopped, substantially as and for the purpose specified.

3. In a computing machine, a register, means for actuating the register, controllers governing the operation of the actuating means, connections between the actuating means and the controllers including branches connected respectively to the controllers, and differential gearing between the branches, and means for stopping the controllers individually in predetermined positions, and thereby locking the actuating means from further movement when all controllers are stopped, the differential gearing operating to transfer the movement of a branch connected to any controller that is stopped which movement would otherwise be received by such branch if the controller were not stopped and transfer the motion to the other branches and hence to accelerate the movement of the controllers of the other branches to their stopping points, substantially as and for the purpose set forth.

4. In a computing machine, a register, controllers governing the actuation of the register, the controllers being movable individually about an axis variable distances during each operation of the machine, means for actuating the controllers individually in their paths of movement, and means for transferring the movement of a controller when stopped which movement would otherwise be received by such controller, to another controller and thereby accelerating the movement of the latter controller to its stopping point, substantially as and for the purpose described.

5. In a computing machine, a register, controllers governing the actuation of the register, the controllers being movable individually about axes, means for actuating the controllers and the register including branches connected respectively to the controllers, and differential gearing between the branches operating to transfer the motion of controller when stopped which motion would otherwise be received by such controller, to the branches connected to the other controllers and to accelerate the movements of the latter controllers to their stopping points, and means for stopping the controllers at predetermined points in their movements about their axes, substantially as and for the purpose specified.

6. In a computing machine, a register, controllers governing the actuation of the register, the controllers being movable individually about a common axis, means for actuating the controllers and the register including branches connected respectively to the controllers, and differential gearing between the branches operating to transfer the motion of a controller when stopped which motion would otherwise be received by such controller to the branches connected to the other controllers and to accelerate the movements of the latter controllers to their stopping points, and means for stopping the controllers at predetermined points in their movements about their common axis, substantially as and for the purpose described.

7. In a computing machine, a register, controllers governing the actuation of the register, the controllers being movable about a common axis, means for actuating the controllers in opposite directions during each operation and for actuating the register, means for transferring the movement of a controller when stopped which motion would otherwise be received by such controller, to the other controller, and means for stopping the controllers at certain angles in their movement about their axis, substantially as and for the purpose specified.

8. In a computing machine, a register, controllers for governing the actuation of the register, the controllers being movable about a common axis, means for actuating the controllers in opposite directions and for actuating the register, means for stopping the controllers at certain angles in their movement about their axis, and means for limiting the movement of the controllers when not stopped by the former means to approximately a half revolution, substantially as and for the purpose set forth.

9. In a computing machine, a register, controllers for governing the actuation of the register, the controllers being movable about a common axis, means for actuating the controllers in opposite directions and for actuating the register, means for stopping the controllers at certain angles in their movement about their axis, and means movable with the controllers for limiting the controllers to approximately a half revolution when not stopped by said stopping means, substantially as and for the purpose described.

10. In a computing machine, a register, controllers governing the actuation of the register, the controllers being movable about a common axis, means for actuating the controllers in opposite directions and for actuating the register, said actuating means including branches connected respectively to the controllers to rotate the same in opposite directions, and differential gearing between said branches, and means for stopping the controllers at predetermined angles in their movements about their axis, substantially as and for the purpose specified.

11. In a computing machine, a register, two pairs of controllers governing the actuation of the register, means for actuating the controllers and the register including main branches connected respectively to the pairs of controllers, each branch having sub-branches connected respectively to the controllers of one pair, differential gearing between the main branches other differential gearing between the sub-branches, and means for determining the extent of movement of the controllers, substantially as and for the purpose described.

12. In a computing machine, a register, two pairs of controllers governing the actuation of the register, means for actuating the controllers and the register including main branches connected respectively to the pairs of controllers, each branch having sub-branches connected respectively to the controllers of one pair, differential gearing between the main branches, other differential gearing between the sub-branches, and means for stopping the controllers at predetermined points in their paths of movement, substantially as and for the purpose set forth.

13. In a computing machine, a register, two pairs of controllers for governing the actuation of the register, the controllers being concentrically arranged, means for actuating the controllers and the register comprising main branches connected respectively to the pairs of controllers, each branch having sub-branches connected respectively to the controllers of one pair, differential gearing between the main branches, other differential gearing between the sub-branches, and means for stopping the controllers at predetermined points in their paths of movement, substantially as and for the purpose described.

14. In a computing machine, a register, two pairs of controllers for governing the actuation of the register, the controllers being concentrically arranged and including radially extending arms, means for actuating the controllers and the register, comprising main branches connected respectively to the pairs of controllers, which branches have sub-branches connected respectively to the controllers of the pairs, differential gearing between the main branches, differential gearing between the sub-branches, means for stopping the controllers at predetermined points in their paths of movement, and means movable with the controllers for limiting the controllers not stopped to approximately a half revolution, substantially as and for the purpose specified.

15. In a computing machine, a register, two pairs of controllers for governing the actuation of the register, the controllers being concentrically arranged and including radially extending arms, means for actuating the controllers and the register, comprising main branches connected respectively to the pairs of controllers, which branches have sub-branches connected respectively to the controllers of the pairs, differential gearing between the main branches, differential gearing between the sub-branches, means for stopping the controllers at predetermined points in their paths of movement, the said branches being connected to the controllers to rotate the controllers of each pair in opposite directions, and means movable with the pairs of controllers for preventing the controllers of each pair from passing each other when each controller of each pair has made approximately a half revolution, substantially as and for the purpose set forth.

16. In a computing machine, a register, controlling means for governing the actuation of the register comprising an arm movable about an axis, means for actuating the arm and the register, including a main actuator, and connections between the main actuator and the register and connections between the main actuator and the arm, and means for limiting the movement of the arm at different angles in its movement about its axis and thereby preventing the operation of the main actuator, substantially as and for the purpose described.

17. In a computing machine, a register, controllers governing the actuation of the register, comprising nested shafts and radial arms mounted respectively on the shafts, means for actuating the shafts and the register, and means for engaging the arms to stop the rotation of the shafts in predetermined positions, substantially as and for the purpose specified.

18. In a computing machine, a register, controllers for governing the actuation of the register comprising nested shafts each having a rock arm and a gear wheel thereon, and means for actuating the controllers and the register comprising differential gearing, the opposite sides of which are geared to the gear wheels of the controllers, substantially as and for the purpose set forth.

19. In a computing machine, a register, and means operating to actuate the register to subtract the units of measure unused from the total capacity of said register, said means comprising controllers for governing the actuation of the register, the controllers being movable individually varying distances from their starting points, means for stopping the controllers individually in their paths of movement, and means for actuating the register and the controllers including branches connected respectively to the controllers and differential gearing between the branches, said gearing operating to transfer the movement of a controller when stopped which movement would otherwise be received by such controller from the branch connected thereto, to the branch connected to another controller, and hence to accelerate the movement of the latter branch and its controller to their stopping point, substantially as and for the purpose specified.

20. In a computing machine, a register, controllers for governing the actuation of the register, movable in opposite directions with respect to each other, to and from their starting positions, and means for stopping the controllers in their paths of movement comprising a circular series of stops movable into the paths of the controllers, substantially as and for the purpose described.

21. In a computing machine, a register, controllers for governing the actuation of the register, and means for stopping the controllers at predetermined points in their paths of movement comprising concentric series of stops movable into the paths of the controllers, substantially as and for the purpose specified.

22. In a computing machine, a register, controllers for governing the actuation of the register, including arms movable about a common axis, and means for stopping the arms at predetermined points in their paths of movement about their axis comprising two series of concentrically arranged stops, the series of stops being also arranged concentric with the axis of said arms, substantially as and for the purpose described.

23. In a computing machine, a register, controllers for governing the actuation of the register, the controllers comprising arms movable about a common axis, means for opping the arms at predetermined points in their paths of movement about their axis, comprising a series of stops arranged concentric with the axis of said arms, and a receiver for a perforated card through the holes of which the stops move into the paths of the controllers, the card receiver being interposed between the series of stops and the controllers, substantially as and for the purpose set forth.

24. In a computing machine, a register, a motor, connections between the motor and the register, operating means for permitting the operation of the motor to actuate the register, said means being movable relatively to the connections, controlling means for governing the actuation of the motor and the movement of said connections, and means for stopping the controlling means at predetermined points, and hence stopping the motor and connections from movement with the operating means, substantially as and for the purpose set forth.

25. In a computing machine, a register, a motor, connections between the motor and the register, operating means for permitting the operation of the motor and the connections, controllers for governing the operation of said motor and the connections, connections between the former connections and the controllers including branches connected respectively to the controllers and differential gearing between the branches, and means for determining the extent of movement of the controllers by the operating means, substantially as and for the purpose specified.

26. In a computing machine, a register, a motor, connections between the motor and the register, operating means for permitting the operation of the motor, and the connections, controllers for governing the operation of said motor and the connections, connections between the former connections and the controllers including branches connected respectively to the controllers, and differential gearing between the branches, and means for stopping the controllers at predetermined points in their movement, and hence stopping the motor and said connections from movement with the operating means, substantially as and for the purpose described.

27. In a computing machine, a register, controllers for governing the actuation of the register, a motor, connections between the motor and the register and between the motor and the controllers, a series of stops movable into the path of the controllers, a carrier for the stops, and operating means operable to permit actuation of the register and the controllers by the motor until the controllers are limited by stops of said series, the operating means including a shaft, connections operated by the shaft and connected to the carrier, and connections operated by the shaft and coacting with the motor driven connections to normally prevent movement of the motor-driven connections by the motor, substantially as and for the purpose set forth.

In testimony whereof, I have hereunto signed my name in the presence of two attesting witnesses, at Syracuse, in the county of Onondaga, and State of New York, this 24th day of April, 1915.

ALEXANDER T. BROWN.

Witnesses:
  S. DAVIS,
  J. GLAZIER.